US012411894B2

United States Patent
Jha

(10) Patent No.: US 12,411,894 B2
(45) Date of Patent: Sep. 9, 2025

(54) SELF-ORGANIZING MODELING FOR TEXT DATA

(71) Applicant: MasterControl Solutions, Inc., Salt Lake City, UT (US)

(72) Inventor: Krishna Nanda Jha, Media, PA (US)

(73) Assignee: MASTERCONTROL SOLUTIONS, INC., Salt Lake City, UT (US)

( * ) Notice: Subject to any disclaimer, the term of this patent is extended or adjusted under 35 U.S.C. 154(b) by 0 days.

(21) Appl. No.: 18/458,470

(22) Filed: Aug. 30, 2023

(65) Prior Publication Data

US 2024/0346086 A1   Oct. 17, 2024

Related U.S. Application Data

(60) Provisional application No. 63/459,090, filed on Apr. 13, 2023.

(51) Int. Cl.
*G06F 16/906* (2019.01)
*G06F 16/901* (2019.01)
*G06F 16/93* (2019.01)

(52) U.S. Cl.
CPC .......... *G06F 16/906* (2019.01); *G06F 16/901* (2019.01); *G06F 16/93* (2019.01)

(58) Field of Classification Search
CPC ...... G06F 16/906; G06F 16/93; G06F 16/901; G06F 16/35
See application file for complete search history.

(56) References Cited

U.S. PATENT DOCUMENTS

| | | | | |
|---|---|---|---|---|
| 8,788,701 | B1* | 7/2014 | Byrnes | G06F 16/35 709/231 |
| 2005/0022106 | A1* | 1/2005 | Kawai | G06F 16/355 715/233 |
| 2006/0112040 | A1* | 5/2006 | Oda | G06F 16/355 707/E17.08 |
| 2008/0205774 | A1* | 8/2008 | Brinker | G06F 16/353 382/225 |
| 2009/0307213 | A1* | 12/2009 | Deng | G06F 16/35 707/999.005 |
| 2011/0202886 | A1* | 8/2011 | Deolalikar | G06F 16/353 715/853 |
| 2012/0041955 | A1* | 2/2012 | Regev | G06F 16/355 707/E17.089 |
| 2015/0286704 | A1* | 10/2015 | Shyr | G06F 16/35 707/737 |
| 2018/0032897 | A1* | 2/2018 | Cao | G06N 20/10 |
| 2020/0279105 | A1* | 9/2020 | Muffat | G06N 3/08 |
| 2020/0311414 | A1* | 10/2020 | Enuka | G06F 16/353 |
| 2023/0409644 | A1* | 12/2023 | Wu | G06F 16/93 |

\* cited by examiner

*Primary Examiner* — William P Bartlett
(74) *Attorney, Agent, or Firm* — Workman Nydegger

(57) ABSTRACT

A method is for self-organizing modeling for digital data, and includes receiving a set of digital documents, vectorizing the set of digital documents to generate document vectors, compressing the document vectors, clustering the compressed document vectors into a cluster set, calculating a utility score of the cluster set of the compressed document vectors, and optimizing over a plurality of cluster sets to find one or more cluster sets with a peak utility value score.

16 Claims, 12 Drawing Sheets

300

| |
|---|
| During review of batch 21129, it was discovered that there were personnel samples missing for R.Fulcher during filtering and filling of the batch on 06-08-21. Per conversation between A.Johnson and M.Perera it was determined that while one technician is filling, the second technician stages and the third performs documentation and other tasks but does not enter the ISO 5 hood during the filter or filling of the batch. Per FSS-SOP-0015, Environmental Monitoring of the Cleanroom Facility, "Personnel that do not enter ISO 5 critical area, but performing tasks specific to a batch being filled, must have fingertips sampled for every batch performing tasks in ISO 7 critical area. |
| The colorimetric solutions used in the analysis of the color of solution test have not been standardized even if it was required by the method. Nonetheless the result was conform. |
| During the shakeout of 494206 Lot MC1M21A, the 10 piece weight check was OOS high |
| Kit 80400 lot number 1901245151 was entered into Vista as kit type 82406. 80400 is the reference number and cannot be used on Trima 7. Trima would not allow the kit to be scanned. Eleven products were collected. |
| Donor id # 2173436 with unit # W04702013634500U has history of ABO O- current ABO O- Donor id # 6958107 has previous ABODX from 7/6/16 with ABO O+ Problem not resolve |
| The method indicates to perform a standard 1 reading (check) between the standard 2 reading and the first sample reading. The analyst forgot to perform this reading. |
| Bags found left open the morning of 11/3/21. |
| On 04/12/21 during manufacturing, COMP staff discovered that SUR unit W045021024344 was missing the ACDA volume. The unit was collected 04/11/21 at OL. PF_135_ACDA was applied to the unit. |
| Operator used more material than required. |
| Procedure record noted less than 85% leukoreduction. This requires the unit is tagged and QM completed. |
| The material was dried down to 18.4% of the original volume, which is outside the parameters of 10Â±5% of the original AX pool volume stated in TL-GMP-BR-1081-00003 Rev 00 step.10.19. |
| APi1222 Lot 210604 Acetate Samples (Sample Set name 15Dec21_APi1222_210604_Acetate) were injected but the sequence was not completed due to system failure. |

FIG. 3

| Doc ID | Issue | Auto Category | Probability | Auto Category Term |
|---|---|---|---|---|
| 17908 | Possible ABL Deviation | 14 | 0.81123 | answer, environment, classify major, deviation, classify, question |
| 20913 | Incorrect collection bag type: CPD should've been CPDA-1 | 30 | 0.6306 | wrong, type, xyz bag, unit collect |
| 4150 | During aseptic filling activity for 047-005-003 in clean room 109, on 21MAY2020 crimp compliance verification of vi | 112 | 0.91134 | asset, calibrate, tolerance, calibration perform |
| 12155 | The calibration provider, PQI, found that ACR #2090 was not operating correctly during calibration on 30Apr2021 a11 | 67 | 1 | weight check, crimp, tray, xyz lot phone, setup |
| 32773 | Duringinspection for Methadone HCl 10 mg/ml 1ml fill 3 ml Syringe (NDC 70004-0380-05) Lot 1U2029686, #83 unit | 58 | 0.74452 | asset, calibrate, tolerance, calibration perform |
| 25888 | On 12/17/21@ 0420, ISX067 (RFG205 3-Dr(RefA) had Alarm3 at 2.60A °C (range=3.00=7.00A °C). Event ID 47923. | 23 | 0.91161 | lafh, blind count perform, aseptic assistant |
| 29831 | On 11Jul2021, a SiP failure occurred in Leukine (CF3) compounding tank M0799 at Pfizer (CMO). Investigation of | 57 | 0.7769 | manual, event, refer, usa xyz, collect xyz |
| 4322 | On 23Nov20, CR112's weekly WFI filter from the week of 01Nov20 received multiple inconclusive results, due to | 71 | 1 | potassium, phenol, sodium chloride |
| 29956 | During the analyst interview, the reson for this error is that whilst reading the sequence by UV/Vis, the analyst | 62 | 1 | bubble point, filter integrity, xyz filter, wall |
| 12355 | Empower Sample Set LC39 Mn CUA 24Sep2021 ran to completion but no audit records were recorded | 8 | 1 | donor record aud, record aud staff |
| 294 | Sample storage location was not documented on QC Vial Reconciliation Form at time of performing final appearance | 90 | 1 | qcd, submit, test january, product xyz, qe |
| 7353 | MNC(A) product destined for Kymriah manufacture was mislabeled at cryopreservation as "Licensed product" | 110 | 1 | number phone, case, extra, xyz collection, xyz product |

*FIG. 6*

| Category ID | Auto Category Terms | Sample Documents |
|---|---|---|
| 1 | hole, post glove, integrity testing | On 04Oct20, during post-use glove testing for production lot 131-006-001, multiple gloves failed visual inspection (R1G2, C1GI/G2/G3, C2G2/G3, and C3GI/GS) and/or integrity testing (C2G4/G7, and C3GI). During pre-use glove testing for 102-002-001, chamber 2 glove 7 failed visual inspection due to a hole <1 mm located in the shoulder. The hole was patched with cleanroom tape, however the glove then failed integrity testing. Reference attachment DEV-2020-0088-001 |
| 2 | bleed time, blood, alyx | W04702208351800C Whole Blood 0 Bleed Time<br>Alyx DIN W04702137130700Y 0 Bleed Time<br>W04701936205800O 0 Bleed time<br>0Bleed Time W04701937274800E<br>W04702217510200X 0 Bleed Time Platelets |
| 3 | emerald, chart, printout, control, normal | Sequence# Incomplete On QC Emerald Printouts Failed to open new normal assayed control.<br>Missing QC sequence<br>Secondary initials and date omitted from the Emerald QC printouts.<br>QC analyst neglected to contemporaneously record the TEX buffer information at the time of analysis.<br>Timestamp Incorrect On Emerald Print Outs |
| 4 | aggregate, draw xyz, unit draw, receipt, monitor | Unit W051522044326 drawn at BLM on 07/19/2022 on AMC0017 had aggregates.<br>Unit Aggregated upon receipt to component lab. Unit monitored until outdate. Aggregates persisted W0S1521072805 had aggregate present till 2054 of 10/14/2021.<br>Aggregates still present after 48 hours<br>Unit had persistent aggregates for more than 48 hours<br>Unit aggregated on receipt |
| 5 | gel pack, hospital, january receive | On 09/24/19 while receiving are turn from Childrena's Mercy, DIST discovered the container was packed incorrectly. PLT W045019913109 was packed on top of the gel packs.<br>On 11/29/2020 while receiving a return from St.Lukea's- East, DIST discovered the container was packed incorrectly. PLT W045020914365 (E3088) was packed on top of two gel packs.<br>KC-OUT-0050 instructs hospitals to pack platelets between the gel packs.<br>Bundler will not work with this configuration |

*FIG. 7*

| Doc ID | Issue | Auto Category | Probability | Auto Category Term |
|---|---|---|---|---|
| 32795 | President Trump may have decided he wants to withdraw from the Paris Climate A | 46 | 0.337481 | climate change, gas, solar, energy |
| 12223 | He also refrained from criticizing Russia for meddling in U.S. elections and attacking | 74 | 0.947913 | confront, foreign policy, consequence, strategy |
| 126809 | If leadership ultimately must come from within higher education, will the disruptive | 44 | 1 | school, leadership, teacher, disorder, college |
| 71338 | It was the country's worst terror attack in nearly two decades, and some fear it could | 79 | 0.834252 | Kill people, injury, conflict, train, hit |
| 45863 | Let's start with the premise that we all want American schools to be better. | 44 | 1 | school, leadership, teacher, disorder, college |
| 59720 | Trust us, you won't regret it. | 30 | 0.97615 | prepare, join, trust, forget, watch |
| 14752 | She persisted. | 52 | 1 | surprise, entire, throw, answer, truth |
| 78911 | Join us on this journey. | 30 | 0.907116 | prepare, join, trust, forget, watch |
| 90333 | "We're Number 1!" (We must be so proud...) | 88 | 0.876378 | minute, number, loud, time, area |
| 18888 | World leaders warned that the move could risk regional instability. | 74 | 0.8076 | confront, foreign policy, consequence, |
| 92059 | "Be brave, be positive, never give up, have a heart, go cats. | 53 | 1 | cat, train, cell, action, body |
| 68934 | early Fiorina was spotted in Indianapolis on Wednesday amid reports that the Republic | 99 | 0.982329 | vote, election, immigration, voice, push |
| 98680 | Climate change will leave no aspect of our society and natural world untouched. As | 116 | 0.932646 | xyz january, secretary xyz, lead, january usa |
| 71557 | Husain Abdullah's words come just two weeks after the NFL admitted a link between | 116 | 0.932646 | xyz january, secretary xyz, lead, january usa |
| 198250 | Saving for college is important, especially for poorer families. A college degree | 44 | 0.300151 | school, leadership, teacher, disorder, college |

FIG. 9

| Category ID | Auto Category Term | Sample Documents |
|---|---|---|
| 1 | financial, risk, lack, justice, money | In America, people with lots of money can easily avoid the consequences of bad bets and big losses by cashing out at the first sign of trouble. But workers who move to a place like Atlantic City for a job and invest in a home have no such protection.<br><br>Hiring a financial advisor means taking a giant leap of faith: here's my hard-earned money, make it grow. You are putting your financial future into their hands. The investment process can seem complicated, convoluted and confusing.<br><br>Some Wall Street investors made money as the mortgage market boomed, others profited when it fell apart. Having reaped big. Although I am the son of a professional gambler and a lifetime, self-employed entrepreneur, I preach a gospel of being risk-averse when it comes to money. I want people to be secure and have a safety net before they roll teh dice on an investment. |
| 2 | coffee, drink, price, company, pass | Coffee snobs are worried, but they shouldn't be.<br><br>Lots of brides and grooms-to-be get stuck in the band versus DJ debate, forgetting an additional musical possibility that can make their wedding day absolutely gorgeous: A chamber ensemble. As much as we enjoy seeing wedding fashion evolve, one of our current favorite trends is a take on a classic feature.<br><br>If you're a DIY bride, you've probably already added "arrange wedding flowers" to your to-do list. New Your School of Flower. We've seen tons of hilarious wedding e-cards in the past, but nothing can quite compare to those that bring sex into the Keep in touch! Check out HuffPost Weddings on Facebook, Twitter and Pinterest. So what does a "ghost wedding" look like? in |
| 3 | bride, wedding, unitue, touch, receive | NEW YORK, NY -- More women are making strides in their careers, but a group of influential Latina women want to help others. Women frequently do not have the same level of support or development opportunities that men enjoy -- because they lack peers and mentors. Here are some tips I share with the female executives I coach, as they climb the corporate ladder.<br><br>Who is responsible for helping women break down barriers? The answer is simple: We all are. As women, advocating on behalf of a worthy candidate and recommending her for a career opportunity.<br><br>Computer science is a world where women are disproportionately represented. This leads to a gender bias in the way of our techology. Women aren't seeing the same financial recovery men are. A new report details the extensive violence and abuse that many women in poverty face. |

FIG. 10

SELF-ORGANIZING MODELING FOR TEXT DATA

CROSS-REFERENCE TO RELATED APPLICATIONS

This application claims the benefit of and priority to U.S. Provisional Patent Application Ser. No. 63/459,090 filed on Apr. 13, 2023, and entitled "SELF-ORGANIZING MODELING FOR TEXT DATA," which is expressly incorporated herein by reference in its entirety.

FIELD

The present disclosure relates generally to systems, methods, and computer-readable media for categorizing text data, and particularly for automatically categorizing text data with automatically generated category terms based on a utility score.

BACKGROUND

Computers and computing systems have affected nearly every aspect of modern living. Computers are generally involved in work, recreation, healthcare, transportation, entertainment, household management, etc. Correspondingly, related data have been accumulated in documents, such as papers, images, non-searchable or searchable forms. Valuable information has been buried in large corpus of analog and digital documents.

Document-categorization is helpful in document information-analysis. To categorize documents, a standard approach builds a machine-learning-based classification-model from documents (aka "training dataset") that are pre-tagged with known categories, and then uses this model to categorize other similar documents. But this approach frequently runs into a roadblock when document-categories are unknown to begin with. Without known document-categories, one cannot produce a training dataset of documents tagged with known categories. And, therefore, one cannot build a machine-learning-based classification model for such documents without a valid training dataset. As such, document-category discovery is a pre-requisite to building document classification-models.

Also, recent developments in artificial intelligences (AIs), machine learnings (MLs), large language models (LLMs) such as ChatGPT, and Bidirectional Encoder Representations from Transformers (BERT) and the likes require well-organized training data, which includes documents and corresponding labels. The labels are one of the most important factors that play a major role in training models for AIs, MLs, LLMs, etc.

Current approaches to discovering document-categories include manual review of documents by subject-matter-experts (SMEs) and ad hoc document-clustering followed by manual reviews of clustering-results. It is noted, however, that the SMEs are expensive, and the ad hoc document-clustering is arbitrary and subjective, thereby prone to major variances.

As indicated, labeling is labor-intensive and requires human interventions in time and effort. Even though manual discovering is likely to yield good results over time, it is almost impossible to manually label every document, which has been generated by humans throughout the human history and has been generated and posted on the Internet.

The subject matter claimed herein is not limited to aspects that solve any disadvantages or that operate only in environments such as those described above. Rather, this background is only provided to illustrate one exemplary technology area where some aspects described herein may be practiced.

BRIEF SUMMARY

The present disclosure is related to systems, methods, and computer readable media for automatically categorizing text data with automatically generated labels based on utility values, thereby, efficiently and effectively discovering numbers of categories without prior knowledge about the documents.

One aspect illustrated herein includes a method that may be practiced. The method is for self-organizing modeling for digital data. The method includes acts for receiving a set of digital documents, documents, generating hyperparameter-optimization (HPO)-driven configurations for vectorizer, compressor, and cluster, vectorizing the set of digital documents to generate document vectors (also known as embeddings), compressing the document vectors, clustering the compressed document vectors into a cluster-set, calculating a utility score of the cluster-set of the compressed document vectors, iterating over this procedure to optimize over such cluster sets to find cluster-sets with "peak" utility scores.

Another aspect illustrated herein includes a computer system that may be practiced for self-organizing modeling for digital data. The computer system includes one or more processors and one or more computer-readable media having stored thereon executable instructions. The computer system is configured to, when the instructions are executed by the one or more processors, receive a set of digital documents, vectorize the set of digital document to generate document vectors, compress the document vectors, cluster the compressed document vectors, calculate a utility score of the clusters of the compressed document vectors, optimize over the cluster set to find the "peak" cluster sets, which represent the sought document-groupings.

Still another aspect illustrated herein includes a non-transitory computer-readable medium including instructions stored thereon that, when executed by a computer, cause the computer to perform a method for self-organizing modeling for digital data. The method includes acts for receiving a set of digital documents, vectorizing the set of digital documents to generate document vectors, compressing the document vectors, clustering the compressed document vectors into a set of clusters, calculating a utility score of the plurality of clusters of the compressed document vectors, optimizing over a plurality of cluster sets to find a cluster set, which yields a peak utility score, and displaying the cluster set, which yields the peak utility score.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific aspects which are illustrated in the appended drawings. Understanding that these drawings depict only typical aspects and are not therefore to be considered to be limiting in scope, aspects will be described and explained with additional specificity and detail through the use of the accompanying drawings in which:

FIG. 3 illustrates examples of documents to be processed for categorization and labeling in accordance with aspects of the present disclosure:

FIG. 6 illustrates examples of categories and labels for documents based on probabilities in accordance with aspects of the present disclosure;

FIG. 7 illustrates examples of categories and labels for sample documents in accordance with aspects of the present disclosure.

FIG. 9 illustrates examples of categories and labels for sample documents in accordance with aspects of the present disclosure;

FIG. 10 illustrates examples of categories and labels for documents based on probabilities in accordance with aspects of the present disclosure.

DETAILED DESCRIPTION

The present disclosure is related to systems, methods, and computer readable media for automatically categorizing text data with automatically generated labels based on utility values, thereby, efficiently and effectively discovering numbers of categories without prior knowledge about the documents and automatically providing labels for each category.

Document-category discovery is automated through self-organized clustering of document-meanings guided by hyperparameter optimization (HPO) of a customizable utility score. This process discovers document-clusters as documents-categories, at potentially multiple peak utility scores, thereby keeping the discovery-process objective while also customizing it to suit the needs of the problem at hand.

The systems and methods, as disclosed herein, automatically discover one or more optimal category-sets in fully unsupervised fashion without any a priori knowledge from text and/or non-text datasets, and assigns text-based labels to the discovered categories for easier understanding of the discovered categories. This may be applicable to any dataset whose document-meanings can be represented as embeddings or vectors of numbers. It may leverage sentence embeddings of Large Language Models (LLM), or vectors from more conventional character-token-based vectorizers, for example, Tf-IDF (Term Frequency Inverse Document Frequency of records) vectorizers.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer-readable media such as computer memory. In particular, the computer memory may store computer-executable instructions that when executed by one or more processors cause various functions to be performed, such as the acts recited in the aspects.

Figure 1:
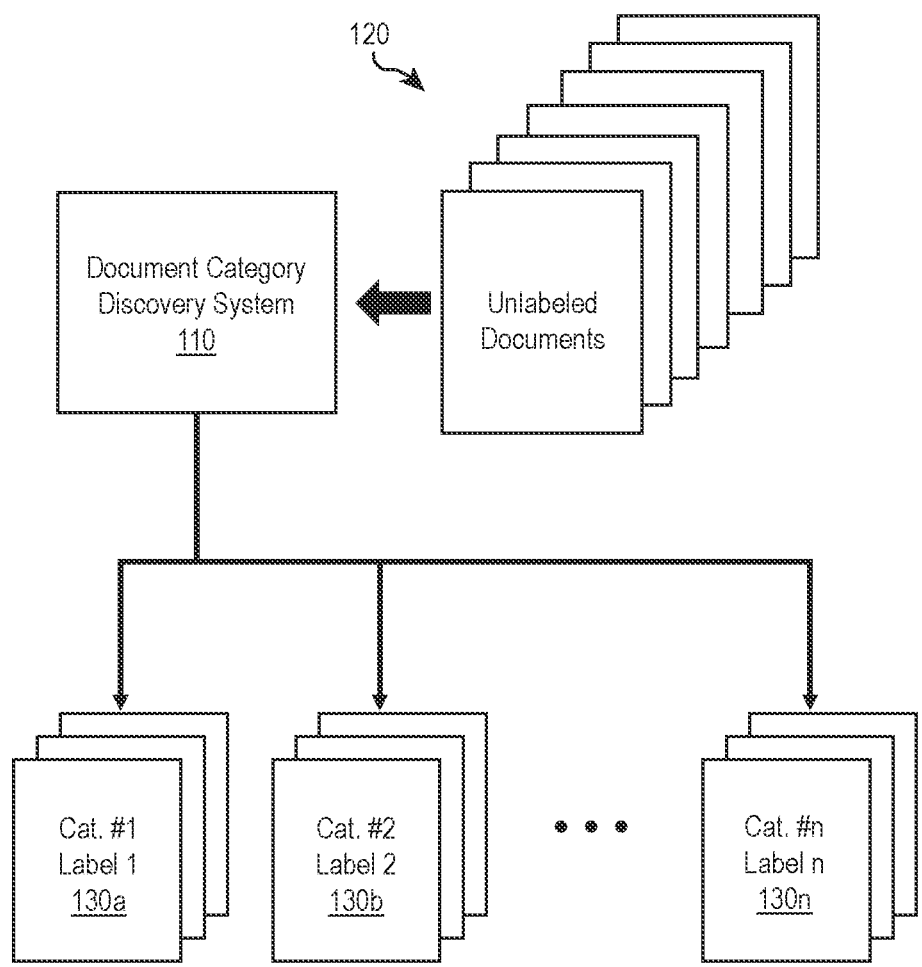
FIG. 1 illustrates a document category discovery system for automatically categorizing documents with corresponding labels in accordance with aspects of the present disclosure.

Referring now to FIG. 1, illustrated is a document category discovery system 110 according to aspects of the present disclosure. The document category discovery system 110 receives unlabeled documents 120 without prior knowledge over categories thereof. the unlabeled documents 120 may be digital or analog documents. To be recognizable, analog documents may be scanned and converted to digital documents prior to submission to the document category discovery system 110.

The unlabeled documents 120 may include texts, images, audio components, and/or video components. In case of images, corresponding description in text format may be required. Alternatively, the document category discovery system 110 may be equipped with optical character recognition features so that the document category discovery system 110 is able to recognize text information from text images. In aspect, the document category discovery system 110 may include artificial intelligence algorithms, which have been trained to extract information from images, so that the document category discovery system 110 can extract text information from the images.

In a case when the unlabeled documents 120 include audio documents, transcription may be performed prior to the submission or by the document category discovery system 110 so that text information thereof can be extracted and submitted to the document category discovery system 110.

In a case when the unlabeled documents 120 include video documents, subscripts may be extracted by performing transcription over the audio part of the video documents and contextual information may also be extracted by AI algorithms, which have been trained.

In short, analog, image, non-textual data may be submitted to the document category discovery system 110 after extracting textual or contextual information therefrom. The document category discovery system 110 performs various operations, which will be described below, to automatically discover one or more optimal category sets and automatically generate labels for the category sets. As a result, the document category discovery system 110 categorizes the unlabeled documents 120 into an optimum or desired number of categories with corresponding labels 130a-130n.

Figure 2:
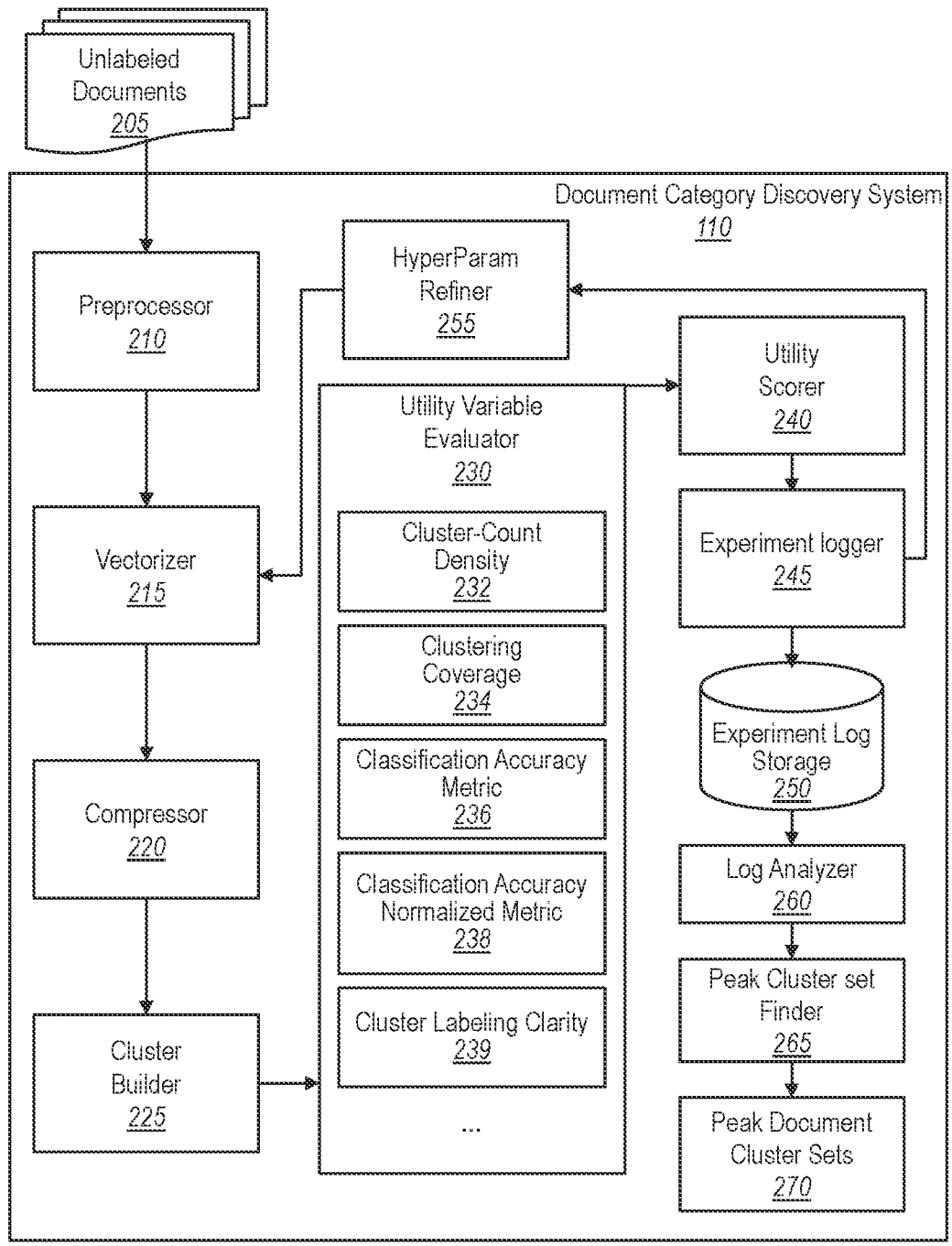
FIG. 2 illustrates a flow diagram of the document category discovery system of FIG. 1 in accordance with aspects of the present disclosure.

The document category discovery system 110 may include a preprocessor 210, a vectorizer 215, a compressor 220, a cluster builder 225, a utility variable evaluator 230, a utility scorer 240, an experiment logger 245, an experiment log storage 250 for the experiment log, a hyperparameter refiner 255, a log analyzer 260, and a peak cluster set finder 265, as illustrated in FIG. 2. In a case where there is only one cluster set, which has the peak utility score, the final result from the document category discovery system 110 is the only one peak document cluster set 270. In another case where there are multiple cluster sets, which have the same peak utility score, the final result from the document category discovery system 110 is multiple peak document cluster sets 270.

When an unlabeled document 205 is provided to the document category discovery system 110, the dataset may be processed by the preprocessor 210. Preprocessing may involve normalizing, transforming, and cleaning text data so that preprocessed dataset is suitable for further analysis.

FIG. 3 illustrates example documents 300 of the unlabeled documents 205. The documents 300 include punctuation marks (e.g., commas, periods, question marks, exclamation marks, colons, semicolons, dashes, hyphens, quotation marks, ellipses, etc.), acronyms, articles, and the likes. The preprocessor 210 may remove any unwanted or irrelevant elements from the documents 300, and remove punctuation marks and special characters. Further, the preprocessor 210 may remove common words (e.g., "is," "was," "were," "and," articles such as "a," "an," and "the," etc.), which do not have significant meaning.

Furthermore, the preprocessor 210 may perform text normalization by transforming different word forms into their base or root forms. For example, "apply." "applying," and "applied" are converted to "apply" This process is called stemming, which is computationally efficient but may produce non-real words. So, lemmatization may be utilized by mapping different forms of words to their dictionary form or lemma. In other words, the preprocessor 210 transforms word forms into the base or root forms, which exist in the dictionary.

As shown in FIG. 3, the documents include "06-08-21," "11/3/2021," and "sep.10.19," which are different representations of dates. The preprocessor 210 may perform text normalization by converting the different representations of dates into one standard form, such as "MM/DD/YYYY." Further, the preprocessor 210 may perform text normalization by converting all characters to lower cases. Furthermore, the documents 300 also include acronyms, such as "ISO," "OOS," "ABO," "QM,", etc. The preprocessor 210 may convert the acronyms to their original uncontracted forms. For example, "ISO" may be converted to "international standard organization."

Still further, the preprocessor 210 may perform non-text normalization, which includes one-hot encoding or labeling of nominals, normalization of numerical values (e.g., z-normalization), and imputation for missing values. Labeling is assigning a number to each name. For example, when there are names, for example, names of cities or countries, a number is assigned to each name. On the other hand, one-hot encoding is to assign categorical data to a series of binary variables.

When there are many numerical values in one category within one document or over the unlabeled documents, all values are normalized such that the mean of all of the numerical values becomes 0 and the standard deviation becomes 1. In this way, numerical values on both sides of outliers may be easily identified and can be discarded so that the outliers do not have much influence on interpretation over the overall numerical values.

As a part of normalization, the preprocessor 210 may assign a number for missing values based on inference or interpolation.

In these ways, the preprocessor 210 may be able to remove unwanted, irrelevant, or insignificant information and to standardize the textual information in possibly one form so that the unlabeled documents 205 can be later compared with each other for further analysis.

After the unlabeled documents 205 have been preprocessed by the preprocessor 210, the vectorizer 215 performs vectorization over the preprocessed documents or, in other words, converts the preprocessed documents into numerical vector (embedding) format. For example, a document, a sentence, phrase, word, or character may be vectorized so as to be represented by embeddings or numerical vectors, of which each includes an ordered set of numbers, such as (0.1, 0.2, 0.3, 0.4, . . . , 0.9), so that mathematical and statistical operations can be performed to analyze and compare the vectors.

The vectorizer 215 may incorporate frequency, presence/absence of each word in the documents. Further, the vectorizer 215 may also capture sematic meaning of words by mapping them to dense vectors in a high-dimensional space.

In aspects, the vectorizer 215 may utilize large language model (LLM)-, deep learning model-, neural network algorithm-, or any other AL algorithm-based text-to-vector methods, such as sentence transformer or transformer-based encoder such as bidirectional encoder representations from transformers (BERT). The vectorizer 215 may also use a character-token counter based vectorizer, such as Tf-IDF vectorizers at the cost of slightly degraded output quality. The vectorizer 215 may further vectorize documents so that the document vectors are semantic vectors. Thus, the vectorizer 215 may be performed in both cases where semantics has more priority than non-semantics or non-semantics has more priority than semantics.

This list of methods is provided to show examples and can include any other suitable methods. The vectorizer 215 may further build appropriate vectors from non-text data records.

When the preprocessed documents are vectorized, the dimensions of the document vectors are generally large and the compressor 220 compresses the dimensions of the document vectors to a smaller dimension while minimizing information loss due to the compression. The desired smaller dimension may be in a range from 10 to 30. In an aspect, the desired dimension may be larger than 30 based on the number and characteristics of the unlabeled documents 205.

In aspects, the compressor 220 may utilize uniform manifold approximation and projection (UMAP) or principal component analysis (PCA). UMAP preserves the local structure of document vectors in both the high-dimensional and low-dimensional spaces so that nearby points in the high-dimensional space remain close in the reduced-dimensional space, while distant points can be further apart, and PCA identifies a direction (i.e., the principal component) where maximum variance lies in the data, and projects the data onto the direction to reduce the dimension.

UMAP employs several parameters in reducing the dimension of the vector space. Specifically, parameters may include "n_neighbors," "n_components," "metric," "min_dist," "spread," "set_op_mix_ratio," and "random_state" The "n_neighbors" parameter determines the number of nearest neighbors considered for each document vector during the construction of a local neighborhood graph. The value of "n_neighbors" captures local structure, while it may lead to increased computation time. The "n_components" parameter specifies the number of dimensions in the reduced representation, and determines the desired dimensionality of the vector space, while preserving its structure in this lower-dimensional vector space.

The "metric" parameter specifies a distance used to measure similarity or dissimilarity between document vectors in the vector space. The "metric" parameter may be measured by Euclidean distance, Manhattan distance, cosine distance, or correlation distance. In particular, the Euclidean distance "d" between two document vectors $\vec{x}$ and $\vec{y}$ may be calculated by the following equation:

$$d = \sqrt{\sum_{i=1}^{n}(x_i - y_i)^2},$$

where $\vec{x}=(x_1, x_2, \ldots, x_n)$ and $\vec{y}=(y_1, y_2, \ldots, y_n)$ and "n" is the dimension of the document vectors $\vec{x}$ and $\vec{y}$. Manhattan distance "$d_M$" between two document vectors $\vec{x}$ and $\vec{y}$ may be calculated by the following equation:

$$d_M = \Sigma_{i=1}^{n}|x_i - y_i|.$$

The "min_dist" parameter controls the minimum distance between two document vectors in the reduced vector space, and defines the tightness of the embedding. The smaller the min_dist value is, the more document vectors spread out and the larger the min_dist value is, the more document vectors are closely packed together. Adjusting this parameter can influence the balance between preserving local versus global structure in the vector space.

The "spread" parameter determines the effective scale of document vectors, and influences the level of clustering or separation in the reduced representation. The smaller the "spread" value is, the more the structure in the vector space is localized, while the larger the "spread" value is, the more the global relationships are captured in the reduced representation.

The "set_op_mix_ratio" parameter controls the balance between the intersection operation and the union operation used to combine neighborhoods when constructing a graph. A value of 1.0 emphasizes the intersection operation, focusing on shared nearest document vectors, while a value of 0.0 emphasizes the union operation, capturing a wider range of neighboring document vectors.

The "random_state" parameter is used to specify the random seed, and ensures reproducibility, allowing for consistent results across different runs.

UMAP may utilize portions or all of these parameters in reducing the dimensionality of the document vectors. By adjusting values of these parameter values based on the characteristics of the unlabeled documents 205, UMAP may result in different dimensions in the reduced document vector space.

In turn, the cluster builder 225 builds or discovers a cluster set, which includes clusters of documents over the unlabeled documents 205, which have been compressed to the lower dimension. Clustering involves grouping or partitioning nearby document vectors so that document vectors in one cluster have similar characteristics. For example, a distance between two document vectors in one cluster may be less than a distance between any document vector in one cluster and any document vector in another cluster. The distance may be measured by Euclidean distance, Manhattan distance, cosine distance, or correlation distance.

In aspects, density-based spatial clustering of applications with noise (DBSCAN) or hierarchical density-based spatial clustering of applications with noise (HDBSCAN) may be employed by the cluster builder 225 to build clusters. For explaining purpose only, HDBSCAN is employed below in building the clusters. Other clustering methods are not excluded in this disclosure and may be utilized by the cluster builder 225.

Clusters are defined as document vectors closely positioned from each other. HDBSCAN utilizes parameters to discover cluster sets. The parameters include "MinPts," "Eps" (epsilon), "min_cluster_size," "metric," "algorithm," "leaf_size," and "p." The "MinPts" parameter represents the minimum number of document vectors required to form a dense region or core vector, which is a vector that has at least "MinPts" neighboring document vectors within a specified radius (epsilon). Thus, when "MinPts" is high, denser clusters may be discovered, while less dense clusters may be discovered with a smaller "MinPts."

The "Eps" parameter is the radius within which the algorithm counts neighboring document vectors to determine core vectors, and defines the local density threshold for a document vector to be considered as part of a cluster. A smaller epsilon value limits the influence range of each document vector, resulting in smaller and tighter clusters, while a larger epsilon value allows to include more distant points, leading to larger and more spread-out clusters.

The "min_cluster_size" parameter specifies the minimum number of document vectors required to form a valid cluster. Clusters with fewer document vectors than "min_cluster_size" are considered as noise or outliers. By adjusting this parameter, the minimum size of meaningful clusters is controlled and smaller, potentially insignificant clusters are filtered out.

The "metric" parameter specifies the distance used to measure the similarity or dissimilarity between document vectors. Common distance metrics include Euclidean distance, Manhattan distance, or cosine similarity. The choice of metric depends on the nature of the data and the desired similarity measure.

The "algorithm" parameter specifies the algorithm used to compute the mutual reachability distance and construct a minimum spanning tree (MST). The available options are 'best' and 'generic' The 'best' algorithm is an optimized version suitable for most cases, while the 'generic' algorithm is a slower but more memory-efficient alternative.

The "leaf_size" parameter affects the performance and memory usage of HDBSCAN, and determines the size of the leaf nodes in the KD-tree or ball tree used for efficient nearest neighbor search. Large "leaf_size" values increase memory efficiency and result in slower performance.

The "p" parameter is used when the Minkowski distance metric is selected as the distance metric. It determines the power parameter for the Minkowski distance calculation. The default value may be 2, which corresponds to the Euclidean distance, or may be greater than 2.

By adjusting values of these parameters, HDBSCAN may result in different numbers of clusters or cluster sets.

In aspects, the cluster builder 225 may build discriminating description, such as a set of terms (e.g., words or phrases), for each cluster of documents.

Now referring back to FIG. 2, the document category discovery system 110 includes the utility variable evaluator 230, which evaluates a utility value about the clusters discovered by the cluster builder 225. The utility variable evaluator 230 may consider several utility variables, which include a cluster-count density 232, a clustering coverage 234, a classification accuracy metric 236, a classification accuracy normalized accuracy metric 238, a cluster labeling clarity 239, and the likes. The list of the utility variables is not limited thereto but may include other variables to accommodate characteristics of the unlabeled documents 205.

Specifically, the cluster-count density 232 provides information about concentration or compactness of clusters in a specific region of the data space and represents the number of clusters present in a given region or neighborhood, indicating the degree of clustering in that particular area. Thus, higher cluster-count density indicates better, more likely category segmentation. The cluster-count density 232 may be measured by a number of clusters within a fixed radius or distance.

The clustering coverage 234 may indicate how many document vectors or document vectors are included in the clusters. When document vectors are distant apart from any cluster by a threshold, such document vectors may be considered as outliers and are not included in any clusters. Thus, such document vectors are not covered by any clusters. The clustering coverage 234 is used to show how much the current cluster segmentation covers the document vectors.

Classification accuracy metric 236 and classification accuracy normalized metric 238 may be used to evaluate the quality of a cluster-set of documents. Two or more approaches may be utilized to calculate the classification accuracy. For example, one approach may use the clustered documents as a training dataset for document-classification, where cluster-IDs are the categories or classes. Then, a weak classifier (e.g., a classifier using LogisticRegression or Decision Tree algorithm) may be built from a portion of this training dataset, and the weak classifier is evaluated over the remaining training dataset.

The quality of such classifications is expressed through standard metrics including precision, which may be calculated as a fraction of the number of correctly classified documents (true positive or TP) over the number of all classified documents, which includes the correctly classified documents (TP) and incorrectly classified documents (false positive or FP), recall, which may be calculated as a fraction of the number of correctly classified documents (TP) over the number of all classifiable documents, which includes the correctly classified documents (TP) and non-classified documents (FN), and an F1-score, which may be calculated as a harmonic mean of precision and recall. In other words, the precision, the recall, and the F-1 score are calculated based on the following equations:

$$\text{Precision} = \frac{TP}{TP+FP},$$

$$\text{Recall} = \frac{TP}{TP+FN},$$

and $F-1$ Score =

$$\frac{2}{\frac{1}{\text{precision}} + \frac{1}{\text{recall}}} = \frac{2}{\frac{TP+FP}{TP} + \frac{TP+FN}{TP}} = \frac{2TP}{2TP+FP+FN}.$$

Sometimes, the classification metric alone may provide a misleading accuracy score depending on the diversity of the dataset. For example, a dataset with substantially similar documents may provide a limited number of coherent clusters without accurately measuring the quality of the corresponding cluster set. To guard against such cases, parallel cluster sets may be built with similar distributions with randomly picked documents for each cluster. For example, for a cluster set with 2 clusters of documents where the first cluster includes 10 documents and the second cluster includes 40 documents, a random cluster set of 2 clusters of documents may be built by randomly selecting documents into the two clusters by matching the distribution of the discovered cluster set, in which the first cluster has 10 randomly selected documents and the second cluster has 40 randomly selected documents. Then, a classifier may be built for this random cluster set, which produces classification accuracy for this random cluster set. The actual classification accuracy may be normalized by the classification accuracy for the random cluster set, which provides a robust indicator of the quality of the discovered cluster set.

The cluster labeling clarity 239 may indicate a level of category segmentation for the cluster set. In other words, the higher the cluster labeling clarity 239 is, the clearer category segmentation of the cluster set is.

The utility variable evaluator 230 calculates values of the utility variables, and the utility scorer 240 calculates a utility score based on values of the utility variables. For example, the utility score may be calculated based on normalized values of the utility variables. In an aspect, the utility score may be calculated based on product, mean, mode, or any other suitable functions over the values of the utility variables. In another aspect, the utility score may be a weighted average of the values of the utility variables.

The experiment logger 245 may store or log the utility score, a combination of values of the utility variables 232-238, and the corresponding cluster set of documents in an experiment log storage 250. The number of clusters in the corresponding cluster set rather than the corresponding cluster set may be stored at the experiment log storage 250. The log may be saved as a table, in a database, or in a formatted text format.

After the experiment logger 245 stores the log in the experiment log storage 250, the hyperparameter refiner 255 may sweep or traverse every potential value for each parameter to find combinations of values of the parameters (e.g., the utility variables 232-238), which make the utility score the largest or peak. In another aspect, the hyperparameter refiner 255 may set a portion of the parameters to be constant to lower the number of combinations of parameter values and improve calculation efficiency. Such parameters may be determined when the variance of such parameters have little effects on the change in utility score.

In an aspect, the hyperparameter refiner 255 may repeatedly perform refinements over combinations of parameter values for a maximum number of times, which may be predetermined. The maximum number may substantially cover meaningful breadth of potential combinations of parameter values.

In another aspects, the hyperparameter refiner 255 may determine a direction of increasing or decreasing values of the parameters and adjust values of the parameters based on the determined direction. In an aspect, gradients may be used in determining the direction. For example, the hyperparameter refiner 255 may utilize a generalized reduced gradient non-linear method in adjusting the parameter values. In particular, the generalized reduced gradient non-linear method can find whether to increase or decrease each parameter value so that the utility score can be increased. By increasing or decreasing each parameter value by a small amount, the hyperparameter refiner 255 may be able to find an optimal combination of values for the parameters. With these optimal values for the parameters, the vectorizer 215 vectorizes the unlabeled documents 205 to generate document vectors, the compressor 220 compresses the dimension of the document vectors, and the cluster builder 225 builds cluster sets so that the number of clusters becomes large and the utility score also becomes large.

Figure 4A:
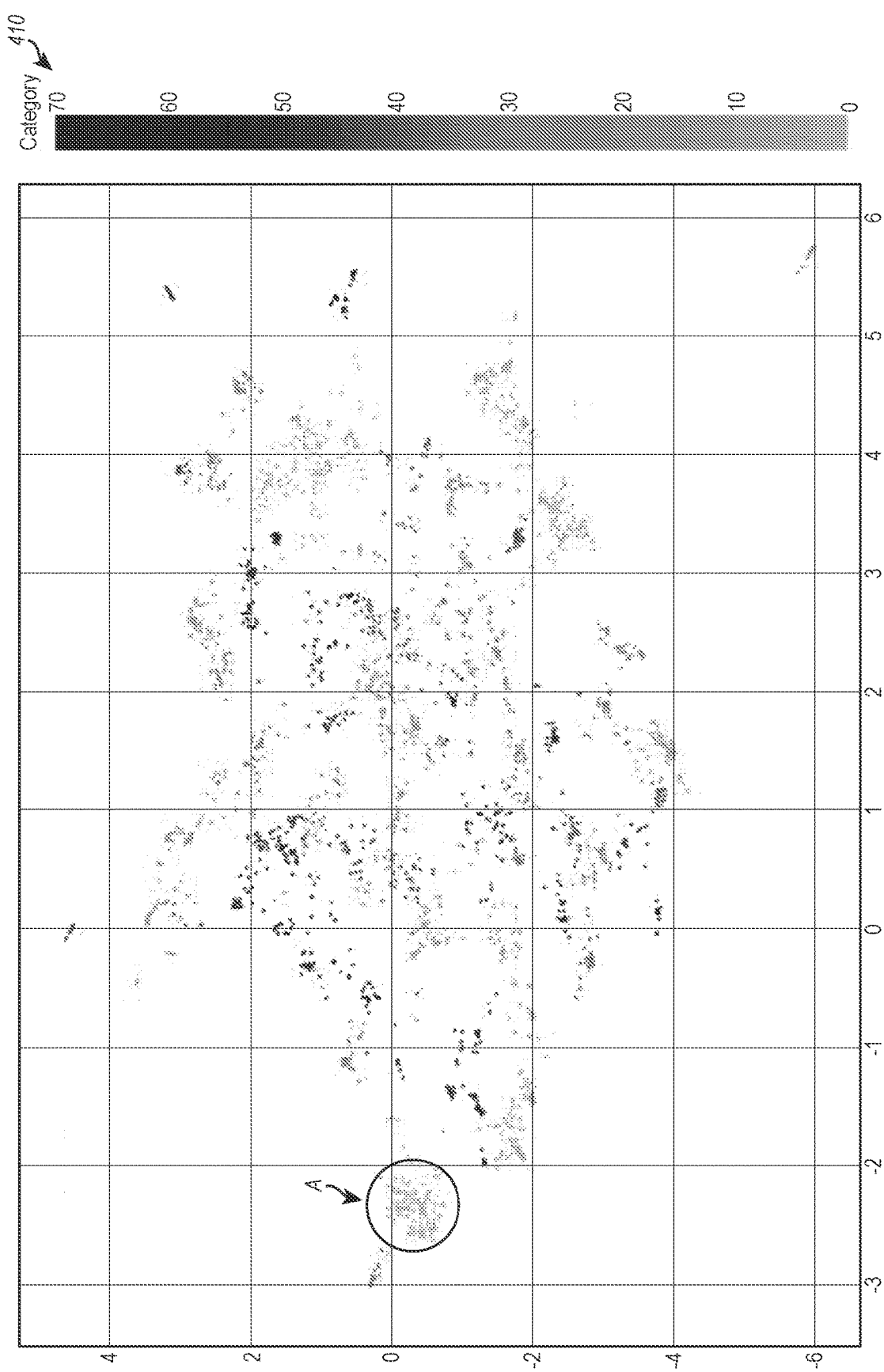
FIG. 4A illustrates a document category data plot of unlabeled documents in accordance with aspects of the present disclosure.
Figure 4B:
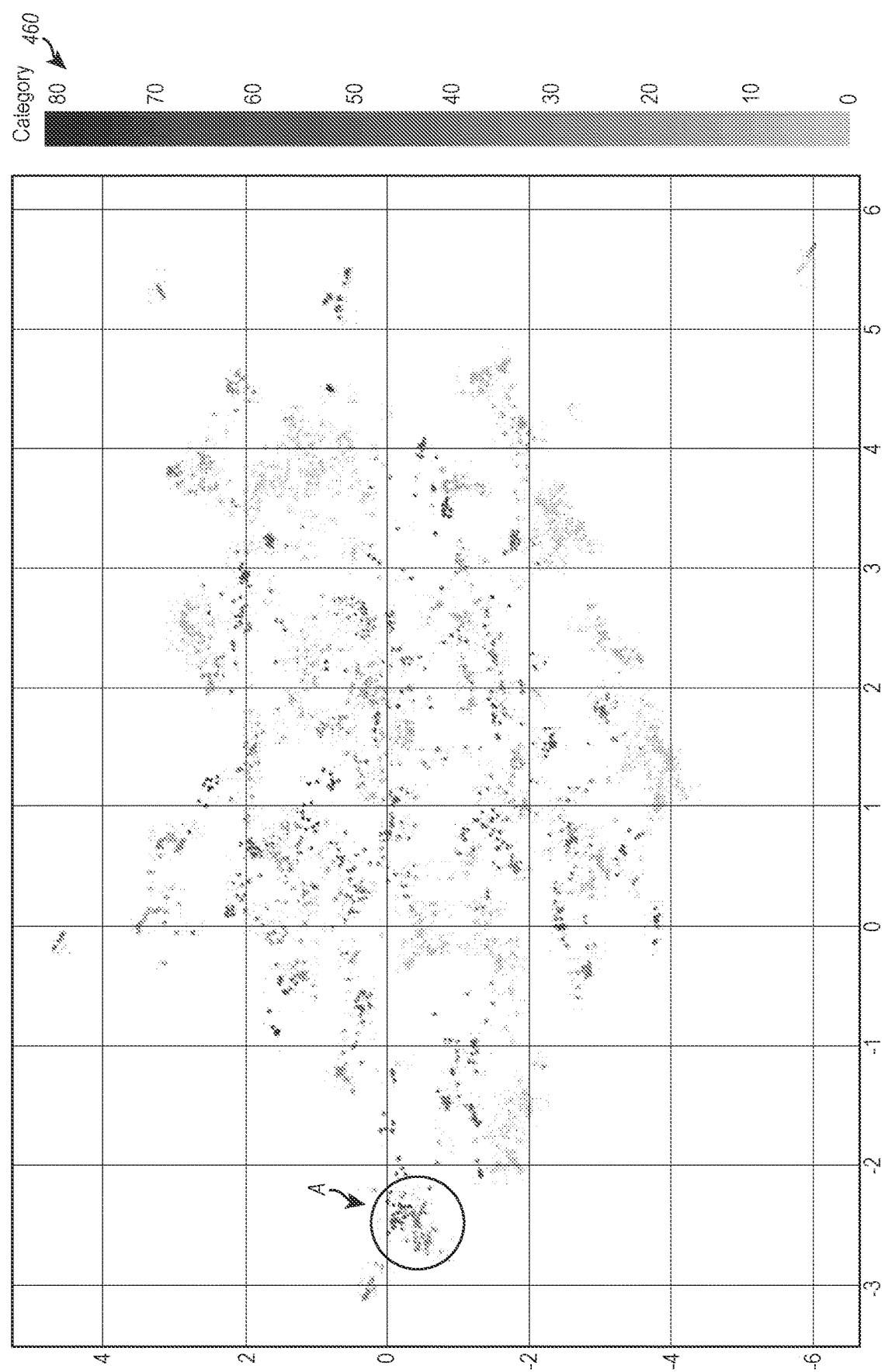
FIG. 4B illustrates another document category data plot of the unlabeled documents in accordance with aspects of the present disclosure.

Examples of cluster sets with parameter values adjusted by the hyperparameter refiner 255 with about 4,000 unlabeled documents are illustrated in FIGS. 4A and 4B. Since the dimension of the document vectors is greater than three, FIGS. 4A and 4B show projection of the document vectors into two dimensions, which include the horizontal and vertical axes. Thus, even though two document vectors are shown in their vicinity in FIGS. 4A and 4B, they might be far away from each other in the dimension of the document vectors.

In FIG. 4A, reference numeral 410 shows a number of categories or clusters based on grayscale values. For example, grayscale values from 0 to 10 or lighter colors indicate $0^{th}$ to $10^{th}$ categories or clusters, and grayscale values from 60 to 70 or darker colors indicate $60^{th}$ to $71^{st}$ categories or clusters.

In FIG. 4A, the hyperparameter refiner 255 sets the value of "n_components" for UMAP to be 12, the value of "n_neighbors" for UMAP to be 13, the "metric" for UMAP to be the Euclidean distance, and the value of "min_cluster_size" for HDBSCAN to be 13, the "metric" for HDBSCAN to be the Manhattan distance. With these set values for the parameters, the total number of documents covered by the clusters is 2535. Thus, the clusters cover about 0.6338 of all 4,000 unlabeled documents. The number of clusters discovered by the cluster builder 225 is 71.

With these values and discovered clusters, the utility variable evaluator 230 evaluates values of the cluster-count density 232, the clustering coverage 234, the classification accuracy metric 236, and the classification accuracy normalized metric 238. The utility scorer 240 then calculates the utility score to be 0.6147.

In FIG. 4B, reference numeral 460 shows a number of categories or clusters based on grayscale values. For example, grayscale values from 0 to 10 or lighter colors indicate $0^{th}$ to $10^{th}$ categories or clusters, and grayscale values from 70 to 82 or darker colors indicate $70^{th}$ to $82^{nd}$ categories or clusters.

With the same 4,000 unlabeled documents used in FIG. 4A, the hyperparameter refiner 255 adjusts the values of the parameters to increase the utility score. In FIG. 4B, the value of "n_components" for UMAP is adjusted to be 10, the value of "n_neighbors" for UMAP is adjusted to be 9, the "metric" for UMAP is the Euclidean distance, and the value of "min_cluster_size" for HDBSCAN is adjusted to be 12, the "metric" for HDBSCAN is the Manhattan distance. With these adjusted values, the total number of documents covered by the categories is 2639. Thus, the clusters cover about 0.6597 of all 4,000 unlabeled documents. The number of clusters discovered by the cluster builder 225 is 82. The utility scorer 240 calculates the utility score to be 0.9115.

Further, to provide an example of different clustering, FIG. 4A has an area "A," which includes one cluster, while the corresponding area "A" in FIG. 4B includes two or more clusters. Thus, by adjusting the values of the parameters to optimal values, one cluster with one setting of parameter values may be segmented or divided into more clusters with another setting of the parameter values.

After iterative performances of the vectorizer 215, the compressor 220, the cluster builder 225, and the utility variable evaluator 230 based on combinations of parameter values set by the hyperparameter refiner 255, the experiment log stored at the experiment log storage 250 may be finalized and analyzed by the log analyzer 260. The utility scores are compared by the log analyzer 260. Based on different combinations of values of the parameters, the log analyzer 260 analyzes the utility scores. The greater the utility score is, the greater the number of clusters are.

Figure 5:
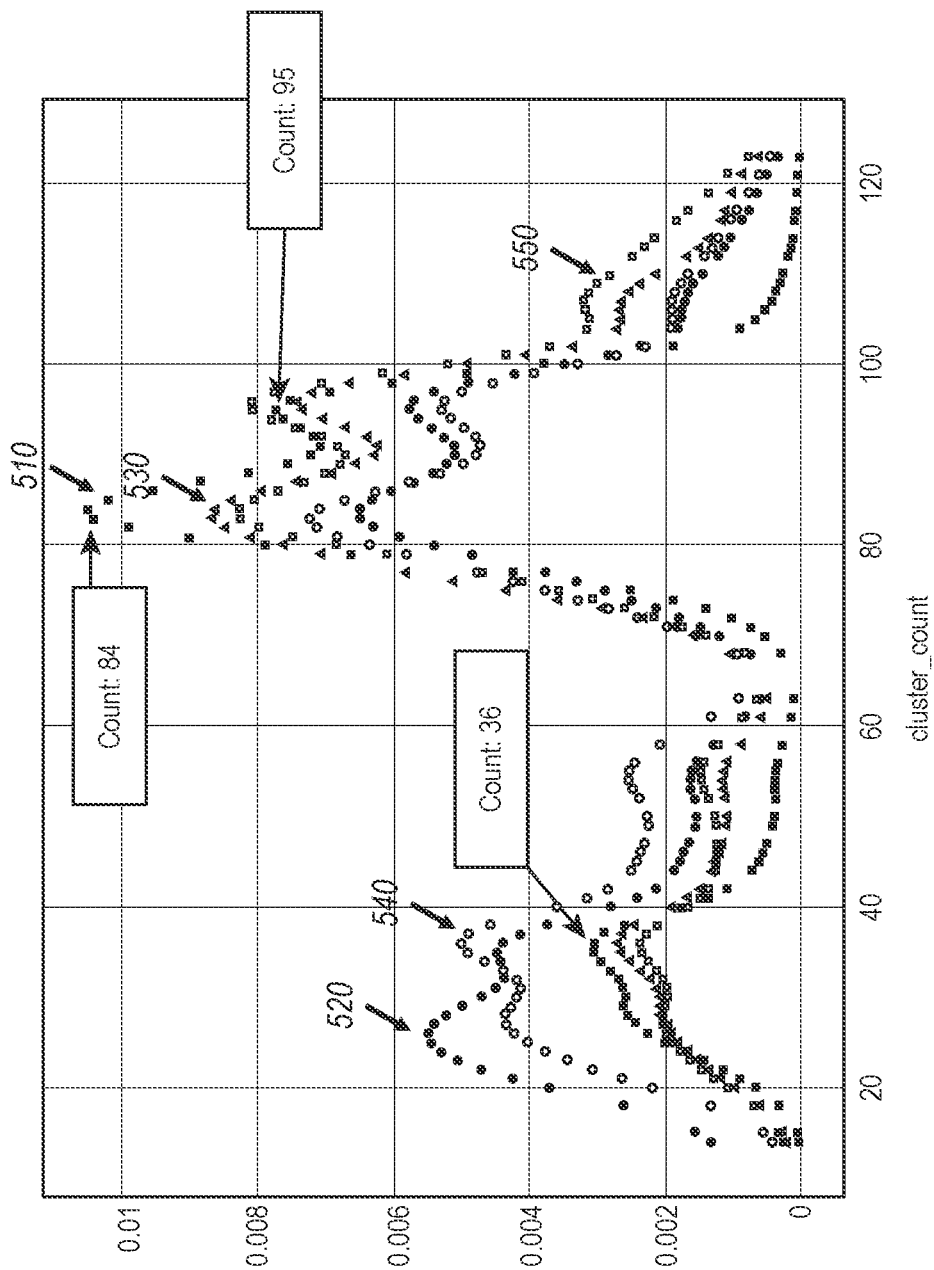
FIG. 5 illustrates data plots of documents to find an optimum number of categories in accordance with aspects of the present disclosure.

The optimal number of categories or clusters may be found based on the magnitude of the utility scores. FIG. 5 illustrates data plots of document vectors based on values of the utility variables. Data plot 510 is based on probabilities of the utility score, data plot 520 is based on probabilities of the classification accuracy metric 236, data plot 530 is based on probabilities of the classification accuracy normalized metric 238, data plot 540 is based on probabilities of the clustering coverage 234, and data plot is based on probabilities of the cluster-count density 232. As described above, the utility score is calculated based on the values of the cluster-count density 232, the clustering coverage 234, the classification accuracy metric 236, and the classification accuracy normalized metric 238. Likewise, the data plot 510 is based on the data plots 520-550.

The data plot 510 shows that probabilities of the utility scores have three local maximums at cluster counts 36, 84, and 95, and the global maximum at cluster count 84. Even though the data plot 510 has the local maximum, of which count is 32, lower than local maximums of the data plots 520 and 540, the global maximum of count 84 of the data plot 510 is greater than any global or local maximums of the data plots 520-540. Since the probability of the utility scores has the global maximum at cluster count 84, the optimal number of clusters may be determined to be 84. In this regard, the log analyzer 260 may be able to find the global maximum of the cluster counts based on the utility scores.

In an aspect, the log analyzer 260 may find a combination of values of utility variables, which results in the maximum utility score, and the peak cluster set finder 265 may find the corresponding cluster set. In another case where the log analyzer 260 may output different combinations of values, which result in the maximum utility score, the peak cluster set finder 265 may find the corresponding cluster sets. The document category discovery system 110 may output the found cluster sets as the peak document cluster sets 270.

FIG. 6 illustrates a table of categories and labels for documents based on probabilities with the 84 clusters from FIG. 5. The first column of the table is document IDs, the second column is brief descriptions of documents, third column is automatically discovered categories, the fourth column is probabilities, and the fifth column is automatically extracted category terms.

Regarding the automatically extracted category terms, now returning back to FIG. 2, the cluster builder 225 automatically extracts discriminating descriptors or terms from the clusters saved in the memory 250. Since the descriptors of one cluster are the representative terms of the cluster, the descriptors are same for all documents in the cluster. In other words, descriptors for one cluster are different from descriptors for another cluster.

The cluster builder 225 may use term frequencies, importance, and distinctiveness within each cluster and extract the most frequent terms and/or terms having the highest importance or distinctive score. The terms may be found not in each document but all documents within the cluster. Further, the descriptors or terms discovered by the cluster builder 225 may be assigned to the cluster or all documents in the cluster.

For example, the document identified by Doc ID 17908 is about possible ABL deviation and assigned to category 14 with probability of 0.81123, and its terms of the category, to which Doc ID 17908 belongs, include "answer," "environment," "classify major," "deviation classify," and "question."

Now turning to FIG. 7, illustrated is a table, which shows category terms for each category and documents in the categories. For example, Category 1 is represented by "hole," "post glove," and "integrity testing" and includes documents as listed in the third column.

Figure 8:
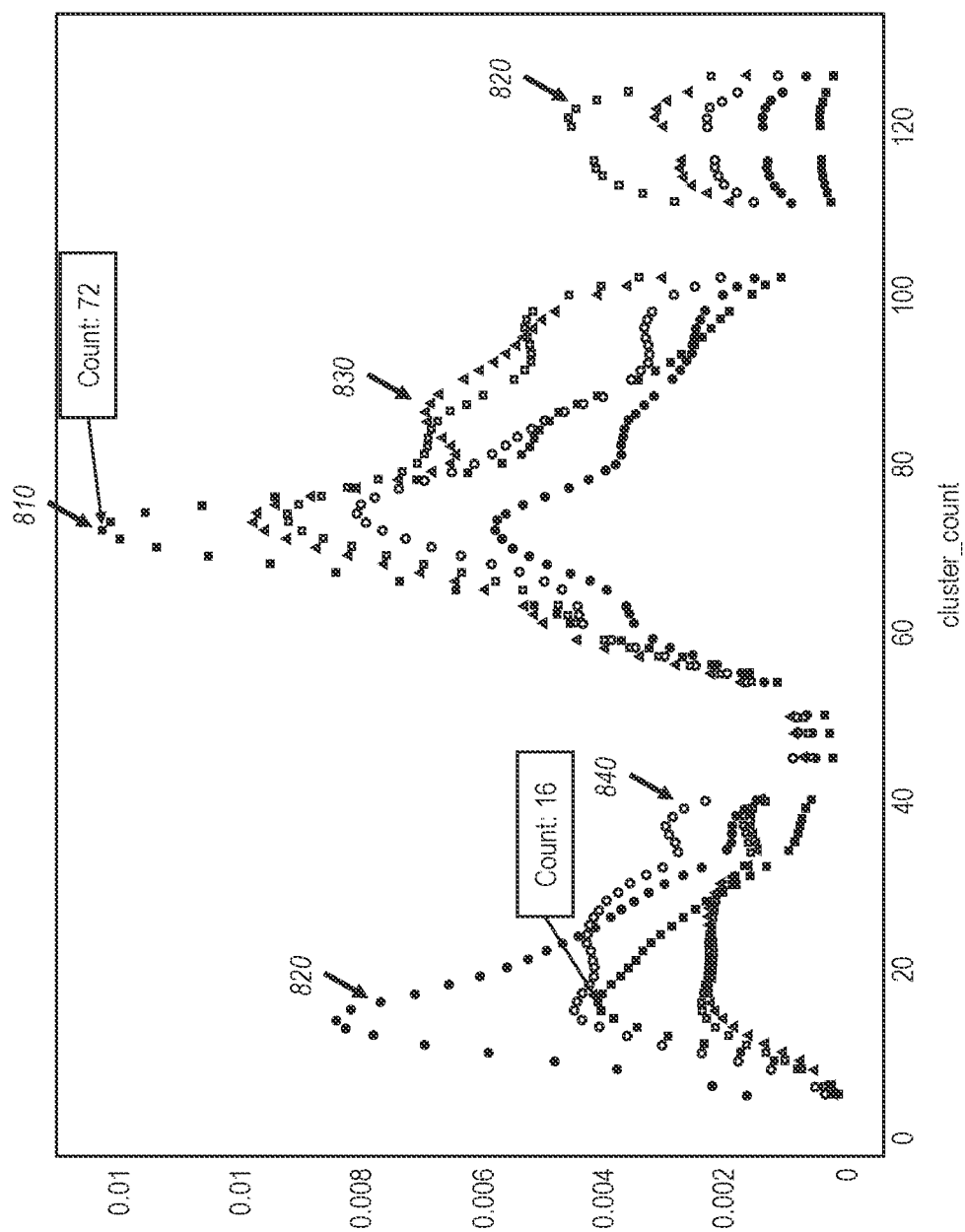
FIG. 8 illustrates data plots of documents to find an optimum number of categories in accordance with aspects of the present disclosure.

Similarly, FIGS. 8-10 illustrate data plots and two tables with unlabeled documents, which are different from the unlabeled documents used in FIGS. 4A-7.

FIG. 8 illustrates data plots of document vectors based on utility variables. Data plot 810 is based on probabilities of the utility score, data plot 820 is based on probabilities of the classification accuracy metric 236, data plot 830 is based on probabilities of the classification accuracy normalized metric 238, data plot 840 is based on probabilities of the clustering coverage 234, and data plot is based on probabilities of the cluster-count density 232. The utility score is calculated based on the values of the cluster-count density 232, the clustering coverage 234, the classification accuracy metric 236, and the classification accuracy normalized metric 238. Likewise, the data plot 810 is based on the data plots 820-850.

The data plot 810 shows that probabilities of the utility scores have two local maximums at cluster counts 16 and 72, and the global maximum at cluster count 72. Since the probability of the utility scores has the global maximum at cluster count 72, the optimal number of clusters or categories may be determined to be 72.

FIG. 9 illustrates a table of categories and labels for documents based on probabilities with the 72 clusters from FIG. 8. The first column of the table is document IDs, the second column is brief descriptions of documents, third column is automatically discovered categories, the fourth column is probabilities, and the fifth column is automatically extracted category terms.

Doc IDs 126809 and 198250 are assigned to the same category, that is Category 44. Thus, Doc IDs 126809 and 198250 have the same representative category terms, "school," "leadership," "teacher," "disorder," and "college." Likewise, Doc IDs 12223 and 18888 are assigned to the same category, that is Category 74 and include the same category terms.

Now turning to FIG. 10, illustrated is a table, which shows category terms for each category and documents in the categories. For example, Category 1 is represented by the terms including "financial," "risk," "lack," "justice," and "money," and includes documents as listed in the third column.

As illustrated in FIGS. 4A-10, the document category discovery system 110 may process unlabeled documents 205, automatically segment the documents into an optimum number of categories or clusters, and automatically extract representative terms for each cluster. In this way, a large number of unlabeled documents may be automatically segmented into an optimum number of clusters and automatically labeled with appropriate terms.

In an aspect, to further increase accuracy, reviewers, users, or editors may verify and confirm the automatically extracted terms for each category.

Figure 11:
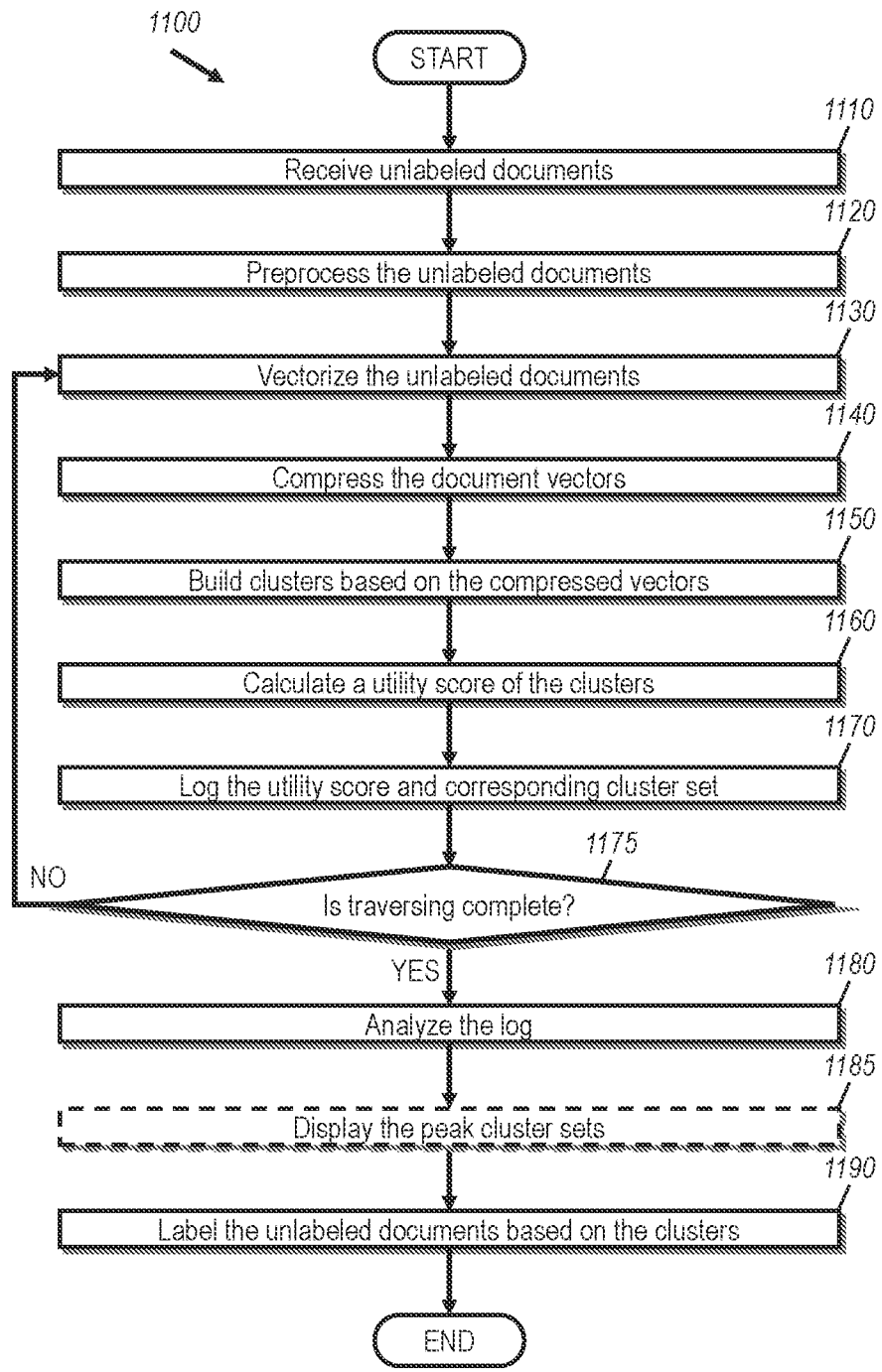
FIG. 11 illustrates a flowchart for a method for automatically categorizing documents with labels in accordance with aspects of the present disclosure.

Now turning to FIG. 11, illustrated is a flowchart of a method 1100 for automatically self-organizing modeling for unlabeled documents according to aspects of the present disclosure. The method 1100 processes digital documents, automatically segments the digital documents into clusters, and automatically labels each category. The labeled categories of documents may be used for training AI, chatGPT, machine learning algorithms, and the likes. Further, the method 1100 may be used to automatically organize a large number of unorganized documents.

The method 1100 includes an act 1110 of receiving the unlabeled documents. The unlabeled documents may be analog or digital documents. In case of analog documents, such needs to be digitalized so that a computer system (e.g., the document category discovery system 110 of FIG. 1) may be able to perform operations over them. The unlabeled documents may include text and image information. The image may be under the optical character recognition (OCR) process so that the computer system may receive textual information contained in the image with the ocr-ed text. In a case where the image information includes non-textual images, the computer system may receive brief textual descriptions of the non-textual images.

The method 1100 further includes an act 1120 of processing the unlabeled documents. For example, the preprocessor 210 of FIG. 2 performs the preprocessing. In most cases, "a," "an," "the," "and," "but," "is," "are," "was," "were," "that," "which," and the likes do not carry important, relative information, and may be removed. During the preprocessing, normalization may also be performed by transforming different word forms into their base or root form via stemming or lemmatization. Further, different date forms may also be converted into a standard form. For example, September 3, 2023, Sep. 3, 2023, 3rd Sep. 2023, 9/3/23, 09/03/3, or the likes may be converted into 09-03-2023.

During the preprocessing, acronyms may be expanded to their original form and contracted words may be converted to their original uncontracted phrases. For example, "US" or "U.S." may be converted to "United States" and "isn't" may be converted to "is not." Also, all upper case characters are converted to lower case characters.

When there is a list of items or a table showing relationships between items in rows and items in columns, the list of items may be converted binary number or decimal numbers via one-hot encoding or nominals. Numbers, whether they are in word format (e.g., one hundred thousand three hundred and three point two three) or in number format (e.g., 100,303.23), may be converted to a pure number format, such as 100303.23. When there are numbers to be compared, such numbers may be converted via z-normalization so that outliers may be easily identified.

This list of preprocessing is provided for explaining purposes only and may include other processes to remove unwanted, irrelevant, or insignificant information, to standardize the textual and numerical information for further processing, and to convert content in the documents to numerical values for further processing and analyses.

The method 1100 also includes an act 1130 of vectorizing the unlabeled documents. Vectorization may convert each document into an ordered set of numerical values, in other words a document vector. For example, when a preprocessed document includes one hundred different words, the corresponding vector may have one hundred ordered numerical values. Since the preprocessed document may include semantic information and relationship between two or more words, the corresponding document vector may have an additional set of numerical values for such in addition to the hundred elements. In this act, the dimension of the corresponding document vector may be relatively large. Thus, without reducing the dimension, future calculations, processing, analyses might require substantially high energy, time, and effort.

To address this problem, the method 1100 further includes an act 1140 of compressing the document vectors by reducing their dimensions. While compressing document vectors, positional and relational locations of document vectors in the vector space need to be substantially preserved. In this regard, PCA and UMAP may be utilized to perform compressing of document vectors. In particular, UMAP may include parameters and, based on set parameter values, UMAP may reduce dimensions of the document vectors. Such parameters may include "n_neighbors," "n_components," "metric," "min_dist," "spread," "set_op_mix_ratio," and "random_state." Detailed description of these parameters can be found above. The dimension of compressed document vectors may be within a range between 10 and 30 inclusive. Based on characteristics, needs, or requirements, the dimension of compressed document vectors may be smaller or larger than the range. In such cases, the values of parameters may be adjusted to meet the requirements. For example, if the number of documents is over one hundred thousand and not less than 1000 categories or clusters are required, the value of neighbors may be adjusted to be larger than or equal to 100, or any other parameter values may be correspondingly adjusted.

The method 1100 further includes an act 1150 of building clusters or categories based on the compressed document vectors. Clusters are by definition groups of data closely related to each other. In other words, compressed document vectors in one cluster have a distance less than a threshold or every compressed document vector is located within a distance from a core document vector. This act 1150 may identify one or more document vectors, which are positioned far away from other document vectors by the threshold, and remove such document vectors as outliers from clusters. The cluster builder 225 of FIG. 2 may perform building clusters.

Parameters related to clustering may also be set to perform building of clusters. For example, a minimum distance may be set between two document vectors such that, for any document vector in one cluster, there is another document vector whose distance from the document vector is less than the minimum distance. This ensures tightness or compactness within each cluster. Further, the size and density of each cluster may also be set to build clusters.

After building the clusters, the method 1100 also includes an act 1160 of calculating a utility score of the clusters. The utility score may be calculated based on other evaluation values of variables. For example, the utility variable evaluator 230 of FIG. 2 may perform evaluations on the evaluation variables, which include the cluster-count density 232, the clustering coverage 234, the classification accuracy metric 236, the classification accuracy normalized metric 238, and the cluster labeling clarity 239 of FIG. 2.

The utility score may be a product, mean, mode, or any other suitable measure over the values of the utility variables. In another aspect, the utility score may be a weighted average of the values of the utility variables.

The method 1100 further includes an act 1170 of logging the utility score, the combination of values of utility variables, and the corresponding cluster set. In an aspect, the experiment logger 245 of FIG. 2 may store them in the experiment log storage 250.

The method 1100 further includes an act 1175 of determining whether or not all combinations of values of the utility variables are traversed. By traversing all combinations of the values of the utility variables, potential sets of clusters may be found in this step. For example, the hyperparameter refiner 255 of FIG. 2 may determine how to traverse the combinations of values of the utility variables.

When the utility score is determined not to be the peak value, the method 1100 further includes an act 1170 of adjusting values of the parameters by the hyperparameter refiner 255 of FIG. 2. The parameters may include all the parameters used in the vectorizer 215 and the cluster builder 225 of FIG. 2. In an aspect, the parameters may include portions of the parameters used in the vectorizer 215 and the cluster builder 225. For example, the parameters may include "n_neighbors" and "n_components" used in UMAP and "min_cluster_size" and "metric" used in HDBSCAN.

When traversing the values of the utility variables, the hyperparameter refiner 255 may sweep all potential combinations of the values of the parameters. In an aspect, the hyperparameter refiner 255 may determine whether to increase or decrease the value of each parameter based on gradient analysis in a way to increase the utility score. In another aspect, the hyperparameter refiner 255 may set a portion of the parameters to be constant to reduce the computational complexity. Such adjustments may be performed while the acts 1130-1165 are iteratively performed until all combination of values of the utility variables are traversed.

When all combination of values of the utility variables are determined to be traversed at act 1175, the method 1100 may include an act 1180 of analyzing the log. For example, the log analyzer 260 of FIG. 2 analyzes the utility scores, combinations of values of the utility variables, and the corresponding cluster set. In a case when there are one or more combinations, of which utility values scores are the highest, the log analyzer 260 may output cluster sets corresponding to the combinations.

The act 1185 may be optional and does not have to be performed. In a case when a user needs the result, the act 1185 may be performed by displaying the one or more cluster sets which have the highest utility score.

Finally, the method 1100 further includes an act 1190 of labeling the documents based on the clusters by the cluster builder 225 of FIG. 2. The cluster builder 225 may find the most frequent terms or phrases, and assign the most frequent terms as the label of the cluster. Further, important and/or distinctive terms or phrases based on semantic analyses may be added to the label of the cluster.

Since the labels of the clusters are representative of the clusters, the label of one document in one cluster is the same as the label of the other documents in the same cluster. Likewise, the label of one cluster is different from the label of another cluster.

The acts 1110-1190 are performed by a computing device (e.g., the document category discovery system 110 of FIG. 1). That means the acts 1110-1190 are performed automatically. Thus, no manual review of each document and no manual labeling of each document is no longer necessary.

Further, the methods as described in this disclosure may be practiced by a computer system including one or more processors and computer-readable media such as computer memory. In particular, the computer memory may store computer-executable instructions that when executed by one or more processors cause various functions to be performed, such as the acts recited in the aspects.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

Cloud and remote based service applications are prevalent. Such applications are hosted on public and private remote systems such as clouds and usually offer a plurality of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available. Examples of software user interfaces include graphical user interfaces, text command line-based user interface, function key or hot key user interfaces, and the like.

Disclosed aspects may comprise or utilize a special purpose or general-purpose computer including computer hardware, as discussed in greater detail below. Disclosed aspects also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, aspects of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described aspects are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for self-organizing modeling for digital data, the method comprising:
receiving digital documents, which are not labeled;
vectorizing each digital document to generate a semantic document vector;
compressing semantic document vectors of the digital documents;
building a plurality of cluster sets of the compressed semantic document vectors without using any prior knowledge of text datasets, non-text datasets, or pre-tagged documents with known categories;
calculating cluster scores comprising a cluster score of each cluster set of the compressed semantic document vectors;
optimizing over the plurality of cluster sets to find an optimum number of clusters for the digital documents based on a peak cluster score, which is highest among the cluster scores, wherein the optimizing over the plurality of cluster sets includes:
storing, in a log on a log storage device, the cluster score, combinations of values of utility variables, and the plurality of cluster sets of the compressed document vectors;
iteratively traversing the values of utility variables of the combinations of the values of the utility variables stored in the log to find one or more combinations of the values of the utility variables that result in the peak cluster score; and
analyzing the log stored on the storage device, to find the optimum number of cluster sets based on the one or more combination of the values that resulted in the peak cluster score;
clustering the digital documents into the optimum number of cluster sets, wherein the optimum number of cluster sets comprises at least two;
automatically generating a label and a category for the each digital document based on a cluster set to which the each digital document belongs in the optimum number of cluster sets; and
training a machine learning model based on the generated label and the category for the each digital document in the cluster set.

2. The method of claim 1, wherein the cluster score is based on a plurality of the utility variables.

3. The method of claim 2, wherein the plurality of utility variables include one or more among a cluster-count density, a clustering coverage, a classification accuracy metric, classification-accuracy metric normalized over random clusters, and a cluster labeling clarity.

4. The method of claim 3, wherein the cluster score is a mathematical measure of the values of the utility variables.

5. The method of claim 4, wherein the mathematical measure is an average, weighted average, L1 norm, L2 norm, product, or joint probability estimator function.

6. The method of claim 1, wherein the receiving the digital documents includes pre-processing the digital documents.

7. The method of claim 1, wherein the label of one of the digital documents in the cluster set is different from the label of one of the digital documents in another of the cluster sets in the optimum number of cluster sets.

8. The method of claim 1, wherein the semantic document vectors have a first dimension and the compressed semantic document vectors have a second dimension less than the first dimension.

9. A computer system for self-organizing modeling for digital data, comprising:
one or more processors; and
one or more computer-readable media having stored thereon executable instructions that when executed by the one or more processors configure the computer system to:
receive digital documents, which are not labeled;
vectorize each digital document to generate a semantic document vector;
compress semantic document vectors of the digital documents;
build a plurality of cluster sets of the compressed semantic document vectors without using any prior knowledge of text datasets, non-text datasets, or pre-tagged documents with known categories;
calculate cluster scores comprising a cluster score of each cluster set of the compressed semantic document vectors;
optimize over the plurality of cluster sets to find an optimum number of clusters for the digital documents based on a peak cluster score, which is highest among the cluster scores, wherein the optimizing over the plurality of cluster sets includes:
storing, in a log on a log storage device, the cluster score, combinations of values of utility variables, and the plurality of cluster sets of the compressed document vectors;
iteratively traversing the values of utility variables of the combinations of the values of the utility variables stored in the log to find one or more combinations of the values of the utility variables that result in the peak cluster score; and
analyzing the log stored on the storage device, to find the optimum number of cluster sets based on the one or more combination of the values that resulted in the peak cluster score;
cluster the digital documents into the optimum number of cluster sets, wherein the optimum number of cluster sets comprises at least two;
automatically generate a label and a category for the each digital document based on a cluster set to which the each digital document belongs in the optimum number of cluster sets; and
training a machine learning model based on the generated label and the category for the each digital document in the cluster set.

10. The computer system of claim 9, wherein the cluster score is based on a plurality of the utility variables.

11. The computer system of claim 10, wherein the plurality of utility variables include one or more among a cluster-count density, a clustering coverage, a classification accuracy metric, a classification accuracy metric normalized over random clusters, and a cluster-labeling clarity.

12. The computer system of claim 11, wherein the cluster score is a mathematical measure of the values of the utility variables.

13. The computer system of claim 12, wherein the mathematical measure is an average, weighted average, L1 norm, L2 norm, product, or joint probability estimator function.

14. The computer system of claim 9, wherein the label of one of the digital documents in the cluster set is different from the label of one of the digital documents in another of the cluster sets in the optimum number of cluster sets.

15. The computer system of claim 9, wherein the semantic document vectors have a first dimension and the compressed semantic document vectors have a second dimension less than the first dimension.

16. A non-transitory computer-readable medium including instructions stored thereon that, when executed by a computer, cause the computer to perform a method for self-organizing modeling for digital data, the method comprising:

receiving digital documents, which are not labeled;
vectorizing each digital document to generate a semantic document vector;
compressing semantic document vectors of the digital documents;
building a plurality of cluster sets of the compressed semantic document vectors without using any prior knowledge of text datasets, non-text datasets, or pre-tagged documents with known categories;
calculating cluster scores comprising a cluster score of each cluster set of the compressed semantic document vectors;
optimizing over the plurality of cluster sets to find an optimum number of clusters for the digital documents based on a peak cluster score, which is highest among the cluster scores, wherein the optimizing over the plurality of cluster sets includes:
storing, in a log on a log storage device, the cluster score, combinations of values of utility variables, and the plurality of cluster sets of the compressed document vectors;
iteratively traversing the values of utility variables of the combinations of the values of the utility variables stored in the log to find one or more combinations of the values of the utility variables that result in the peak cluster score; and
analyzing the log stored on the storage device, to find the optimum number of cluster sets based on the one or more combination of the values that resulted in the peak cluster score;
clustering the digital documents into the optimum number of cluster sets, wherein the optimum number of cluster sets comprises at least two;
automatically generating a label and a category for the each digital document based on a cluster set to which the each digital document belongs, in the optimum number of cluster sets; and
training a machine learning model based on the generated label and the category for the each digital document in the cluster set.

\* \* \* \* \*